3,783,008
PROCESS FOR PREPARING COATED DETERGENT PARTICLES

Helmut H. Weldes, Havertown, and Eric W. Vessey, Springfield, Pa., assignors to Philadelphia Quartz Company, Philadelphia, Pa.
No Drawing. Filed May 4, 1971, Ser. No. 140,305
Int. Cl. B44d 1/02
U.S. Cl. 117—100 A                    2 Claims

ABSTRACT OF THE DISCLOSURE

This invention involves a process for making an improved detergent composition. It consists of spraying a slurry of some ingredients of the composition onto other ingredients. Specifically, a composite of an inorganic salt with an alkali metal silicate with or without a sequestering agent is coated with a slurry of the remaining detergent ingredients and then the coated material is dried to give a free-flowing detergent. The resulting composition is very stable, containing a very low concentration of insoluble material and the concentration of insolubles does not increase on storage.

INTRODUCTION

Many detergents are made by spray drying a slurry of a blend of the detergent ingredients. Sometimes ingredients are added by post blending, such as perfumes or enzymes which are not stable to the high temperatures of the spray dryer. However, the other ingredients of the detergent are blended in an aqueous slurry which is then pumped through a nozzle into a dryer. Most of the water is removed to yield a free-flowing granular powder. These products often contain objectionable insoluble material which often increases on storage.

It is generally known that the insolubles formed during drying and on storage consist mainly of silica. The source of silica is the alkali metal silicate used in many detergents as builders, corrosion inhibitors, and bead forms. These are essential components of detergents. We have found that by changing the manufacturing process, spray dried detergents can be made that contain substantial amounts of alkali metal silicates but that have greatly reduced insoluble contents. These products also resist formation of insolubles on storage. Still another advantage of the process modification is that it allows an increased production rate and thus reduces the processing time.

This invention involves introducing the alkali metal silicate into the spray drying tower as part of a solid hydrated composite that consists of an inorganic salt with alkali metal silicate or an inorganic salt with alkali metal silicate and sequestering agents. The composite is injected into the spray tower with a dust nozzle and the solid particles fall through the spray of slurry from the crutcher. In this way the composite becomes coated with the remainder of the detergent ingredients and after drying, the product is either a complete detergent formula or granules of material ready for blending with dye, perfume, etc. to give a complete detergent formula.

The improvement of the production rate, from practice of this invention, is a result of the higher amount of solids which can be introduced in the spray tower in relation to the amount of water in the slurry and the final product. That is, a much higher amount of solids can be passed through the spray tower, than would be possible to pass through if only a slurry were used.

THE INVENTION

The composites of an inorganic salt with an alkali metal silicate or an inorganic salt with an alkali metal silicate and sequestering agent can be prepared by reacting an alkali metal silicate solution or a stable solution of an alkali metal silicate and a sequestering agent with an essentially anhydrous salt as described in a co-pending patent application S.N. 129,567 (now abandoned), by drying alkali metal silicate solutions in a rotary dryer using a bed of inorganic salts as described in a co-pending patent application S.N. 116,630 (now abandoned), or by subjecting a mixture of inorganic salts and hydrated amorphous alkali metal silicate particles to heat and/or pressure to form granules as described in a co-pending patent application S.N. 116,629 (now abandoned).

The inorganic salts used can include carbonates, bicarbonates, sesquicarbonates, metaborates, tetraborates, phosphates, orthophosphates, tripolyphosphates, sulfates, etc. The silicate solutions used to prepare some of these composites can be of any alkali metal and the silicate can have a mole ratio of $SiO_2/M_2O$ between 1.2/1.0 and 4.0/1.0, in which M stands for an alkali metal or combination of alkali metals. The hydrated amorphous alkali metal silicate particles used to make other composites also may have a mole ratio of $SiO_2/M_2O$ between 1.2/1.0 and 4.0/1.0. The sequestering agent used as part of some of the composites can be any chemical capable of reducing the activity of metal ions in solution and maintaining the ions in solution, especially calcium and magnesium ions which cause water hardness.

These composites are uniform, non-caking granules that exhibit good particle characteristics and do not show any evidence that the water contained is not completely equilibrated. In general, the particle size is in the range of 10 to 65 mesh and the bulk density can vary between 20 and 75 lbs./cu. ft. The moisture content can be between 5 to 35% and the granules are fast dissolving with very little insoluble content. The ratio of inorganic salt solids to alkali metal silicate solids or to alkali metal silicate and sequestering agent solids can be up to 10.0:1.0 and the ratio of sequestering agent solids to silicate solids can be up to 3.6:1.0.

Detergent compositions according to this invention are produced in the following manner. An aqueous slurry of approximately 60% solids is made by blending most of the major ingredients in a crutcher. Some alkali metal silicate solution can be added to this slurry to prevent corrosion of the processing equipment. A typical slurry might include 10 to 85 p.b.w. surfactant paste which may contain 28% linear alkylbenzene sulfonate. 22% $Na_2SO_4$ and 50% $H_2O$; 10 to 60 p.b.w. of sequestering agent, such as STPP or organic sequestering agent; 0 to 20 p.b.w. sodium silicate solution; 0 to 5 p.b.w. antiredeposition agent such as sodium carboxymethyl cellulose (NaCMC); and 0 to 5 p.b.w. of optical brightener. The sodium silicate solution is added to the slurry to prevent corrosion of the processing equipment and to aid bead formation in the spray drying operation. This slurry is blended in the crutcher for a few minutes at 75 to 90° C. before it is pumped into the spray tower through a spray nozzle.

The drying tower is also equipped with a dust nozzle above the spray nozzle. The nozzle is used to introduce the composite of inorganic salt with alkali metal silicate or with alkali metal silicate and sequestering agent. As the particles of the composite fall through the spray of the slurry they become coated and may agglomerate as well. As these coated particles continue through the dryer they are dried to a free-flowing detergent composition.

This process allows the amount of alkali metal silicate added to the detergent to be increased substantially while the amount of water to be removed in the spray tower can remain at about the same level as in present practice or even can be decreased somewhat. Since a higher solids content can be put through the spray tower at the same water removal rate the production rate can be increased substantially.

The product realized from this process is extremely stable especially toward insoluble formation. This stability can be attributed to the fact that the bulk of the silicate and any components that tend to form insoluble silica are not mixed in the detergent slurry and the fact that the silicate is coated and therefore protected from reaction with acidic atmospheric gases such as $CO_2$ that might cause formation of silica.

EXAMPLES

A further understanding of the invention can be obtained from the following illustrative examples which should not be considered restrictive or limitative.

Example 1

A spray dried detergent was prepared according to present practice as follows. A slurry of the composition was made in a crutcher using a sodium silicate solution.

|  | P.B.W. |
|---|---|
| Surfactant paste (28% linear dodecylbenzene sulfonate, 22% $Na_2SO_4$ and 50% $H_2O$) | 64.0 |
| STPP (sodium tripolyphosphate) | 50.0 |
| Sodium silicate soluiton (2.4 $SiO_2/Na_2O$, 50% solids) | 12.0 |
| NaCMC | 1.5 |
| Blancophor RG (optical brightener, GAF Corp.) | 0.3 |

This slurry contained 40 p.b.w. of water, of this 30 p.b.w. must be removed to produce a product of about 10% water content. The slurry was heated at 78° C. for 10 minutes and then pumped through a spray tower with full counter-current air flow and jet type spray. The inlet temperature was 320° C. and the outlet temperature was 93° C. The slurry was pumped to the spray dryer at the rate of 6,550 p.b.w./hour and the production rate of the finished detergent was 5,050 p.b.w./hour of a free-flowing granular product with a density of 0.32 g./cc.; a moisture content of 10.1% and a silicate solids content of 6.0%. The product was an efficient laundry compound with an insoluble content of 0.30%. After aging 6 months in a chipboard box at 70° F. and 50% R.H., the insoluble content was 1.35%.

Example 2

A slurry of the following composition was made in a crutcher.

|  | P.B.W. |
|---|---|
| Surfactant paste of Example 1 | 64.0 |
| Sodium citrate (organic sequestering agent) | 15.0 |
| Sodium glucoheptonate (organic sequestering agent) | 20.0 |
| Sodium silicate solution of Example 1 | 2.0 |
| NaCMC | 1.5 |
| Blancophor RG | 0.3 |

This slurry was pumped into the spray of Example 1 at the rate of 5,200 p.m.w./hour. A powdered composite of STPP and sodium silicate was injected into the spray tower through a dust nozzle above the spray nozzle at the rate of 1,750 p.b.w./hour. The composite of STPP and sodium silicate was prepared by using STPP as a particle bed in a rotary dryer and using that bed to dry a sodium silicate solution. The composition of the composite was: STPP 22%, 2.4 $SiO_2/Na_2O$ sodium silicate solids 60% and $H_2O$ 18%. As the composite fell through the slurry spray it was coated with the slurry. The production of the detergent was 5,450 b.b.w./hour of a free-flowing, granular product with a density of 0.37 g./cc., a moisture content of 10.2% and a silicate solids content of 19.8%. The product was an efficient laundry compound with an insoluble content of less than 0.2%; after aging in the package for 2 months the insoluble content was only 0.25%. This slow development of insoluble material in the detergent indicates that the silicate is protected from reaction and formation of insoluble silicate by the coating of the other detergent components.

Example 3

A slurry of the following composition was made in a crutcher.

|  | P.b.w. |
|---|---|
| Surfactant paste of Example 1 | 64.0 |
| Sodium nitrilotriacetic acid (SNTA) organic sequestrant | 10.0 |
| Sodium silicate solution of Example 1 | 10.0 |
| NaCMC | 1.5 |
| Blancophor RG | 0.3 |

This slurry was pumped into the spray tower of Example 1 at the rate of 5,100 p.b.w./hour. A composite of STPP-SNTA-sodium silicate was injected into the spray tower through a dust nozzle located above the spray nozzle at the rate of 3,300 p.b.w./hour. The STPP-SNTA-sodium silicate composite was prepared by hydrating anhydrous STPP with a stable solution of SNTA and sodium silicate; the composition of the composite was: STPP 41%, SNTA 16.6%, 2.0 $SiO_2/Na_2O$ silicate solids and $H_2O$ 25.2%. As the composite fell through the slurry spray it became coated with the slurry. The slurry was dried and production rate of the detergent was 6,600 p.b.w./hour of a free-flowing granular product with a density of 0.33 g./cc., a moisture content of 17.8% and a silicate solids content of 12.4%. The product was an efficient laundry compound with a very low insoluble content that increases very slowly as the detergent ages.

Example 4

A slurry of the following composition was made in a crutcher.

|  | P.b.w. |
|---|---|
| Surfactant paste of Example 1 | 64.0 |
| Sodium glucoheptonate | 20.0 |
| Sodium citrate | 12.0 |
| Sodium silicate solution of Example 1 | 2.0 |
| NaCMC | 1.5 |
| Blancophor RG | 0.3 |

The slurry was pumped into the spray dryer at a rate of 5,200 p.b.w./hour. A powdered composite of ammonium tetraborate, sodium carbonate and sodium silicate was injected into the spray tower through a dust nozzle located above the spray nozzle at the rate of 1700 p.b.w./hour. The composite was prepared by subjecting a mixture of ammonium tetraborate, $Na_2CO_3$ and spray dried sodium silicate (2.0 $SiO_2/Na_2O$) to pressure agglomeration. The composition of the composite was: ammonium tetraborate 31.6%, $Na_2CO_3$ 17.7%, silicate solids 31.6% and $H_2O$ 19.1%. As the composite fell through the slurry spray it became coated with the slurry. The slurry was dried and the production rate of the detergent was 5,400 p.b.w./hour of a free-flowing granular product with a density of 0.35 g./cc., a moisture content of 10.4% and a silicate solids content of 11.0%. The product was an efficient laundry compound with a very low insoluble content that increases very slowly as the detergent ages.

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. The process for preparing a coated detergent particle consisting essentially of a core containing an inorganic salt and an alkali metal silicate composite and having a coating thereon, consisting essentially of the steps of:
 (a) preparing a spray dryable detergent composition in a crutcher, said composition containing about 60% solids and including 10 to 85 parts by weight of surfactant paste, 10 to 60 parts by weight of sequestering agent, 0 to 20 parts by weight of sodium silicate solution, 0 to 5 parts by weight of anti-redeposition agent, and 0 to 5 parts by weight of optical brightener, and sufficient water to allow said composition to be introduced into a spray dryer for further processing;
 (b) blending said composition at 75 to 90° C.;
 (c) introducing said composition into a spray drying tower through a spray nozzle;
 (d) introducing into said drying tower through a dust nozzle finely divided solid composites containing an inorganic salt and an alkali metal silicate wherein the $SiO_2/M_2O$ ratio on a mole basis is 1.2/1.0 to 4.0/1.0 wherein the dust nozzle is located above said spray nozzle and the introduction of said composites is simultaneous with the introduction of said aqueous composition;
 (e) allowing said composites to fall into the spray of said aqueous composition;
 (f) causing said aqueous composition to form a coating on said composites, and
 (g) drying said composition to obtain free flowing particles.

2. The process of claim 1 in which the core composite additionally contains organic sequestering agent.

References Cited
UNITED STATES PATENTS

| | | | |
|---|---|---|---|
| 2,423,451 | 7/1947 | Holuba | 117—100 A |
| 2,594,469 | 4/1952 | Mahoney | 117—100 A |
| 3,560,391 | 2/1971 | Diehl et al. | 252—135 |
| 3,620,979 | 11/1971 | Corliss et al. | 252—135 |
| 3,655,569 | 4/1972 | Hellsten et al. | 252—135 X |

WILLIAM D. MARTIN, Primary Examiner

T. G. DAVIS, Assistant Examiner

U.S. Cl. X.R.

117—104 R; 252—135